Feb. 9, 1937.    J. N. ALEXANDER    2,070,105
SAW SETTER
Filed Aug. 18, 1934
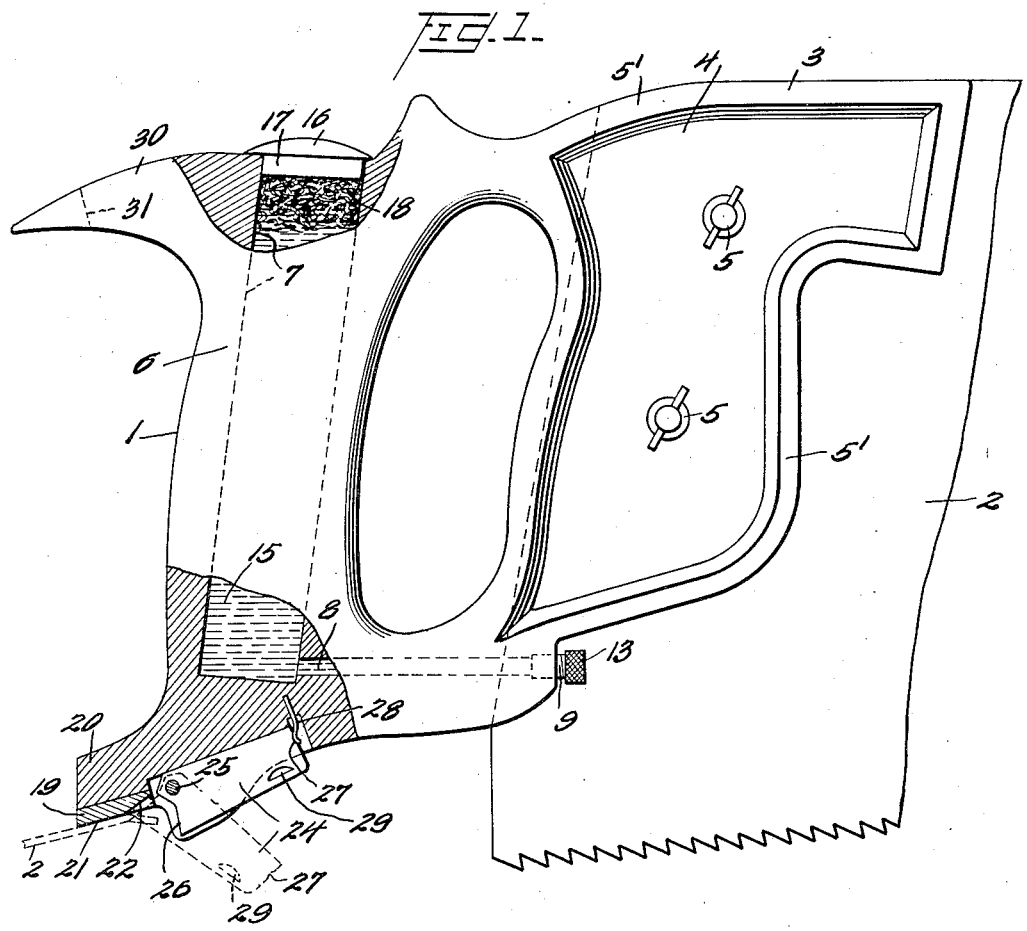
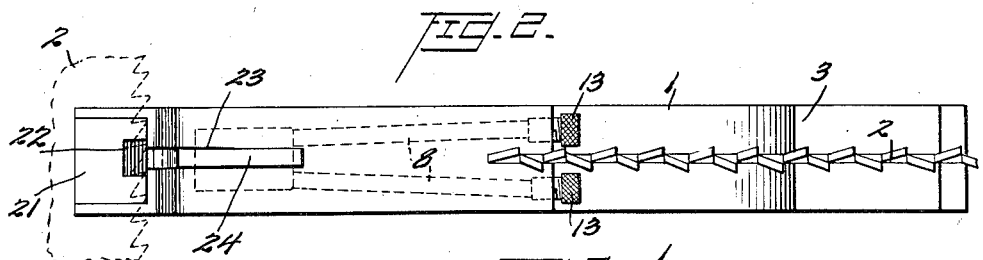
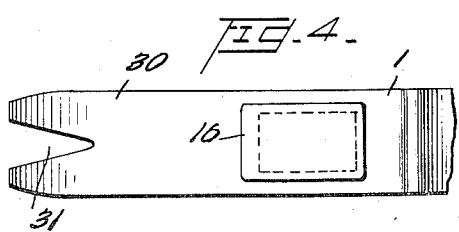
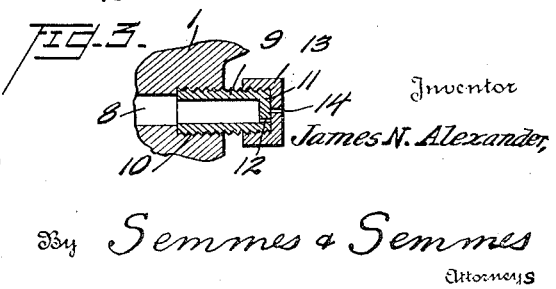
Inventor
James N. Alexander,
By Semmes & Semmes
Attorneys Patented Feb. 9, 1937

2,070,105

UNITED STATES PATENT OFFICE 2,070,105

SAW SETTER

James N. Alexander, Birmingham, Ala.

Application August 18, 1934, Serial No. 740,517

3 Claims. (Cl. 76—65)

My invention relates to saw mechanisms, and in particular to handsaw mechanisms, though some of the features of my device are applicable to mechanisms other than handsaws.

It is an object of my invention to provide a simple and inexpensive yet effective tooth-setting mechanism which is carried by the handle of the saw.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions which, for the purpose of explanation, have been made the subject of illustration.

In the drawing:

Figure 1 is a view in side elevation of a saw equipped with my handle, portions of the construction being shown in section.

Figure 2 is a bottom plan view of my saw handle, the position of the saw teeth for setting being shown in dotted lines.

Figure 3 is a detail view in section through the closure means for the lubrication ducts.

Figure 4 is a top plan view of a portion of the saw handle, showing the nail-pulling arrangement.

Referring to the drawing, I have shown a metallic handle 1 to which is attached a saw blade 2. The handle 1 is provided with bifurcated ends 3 into which fits the saw blade 2. Each bifurcated end is formed with a depressed portion 4, and the saw blade is fitted into place between the bifurcations, and wing nuts 5, which pass through apertures, not shown, hold the saw blade firmly in place. It is to be noted that, in general, the construction is such that the depth of the depressed areas 4 is such as to shield the wing nuts from possible injury in operation of the saw. The outer extremity of the wing nuts generally lies below the edge 5' of the depressed area on each bifurcated end. The material of the handle may be aluminum, or some other light metal or alloy which possesses the requisite strength and lightness and other desirable features.

Formed within the end-engaging portion 6 of the handle is a lubricant reservoir 7. From the bottom of the lubricant reservoir 7 are ducts 8 which lead out to a portion of the handle which is adjacent the face of the blade 2. There are two ducts, one for each blade surface. Each duct has an end fitting which comprises a cylindrical metal member 9 which is screw-threaded, as indicated at 10, into the metal of the handle 1. A portion of the cylindrical screw-threaded member 9 projects beyond the metal of the handle 1 and is provided with a closure 11 having an offset aperture 12 therein of restricted cross section. Fitting over the protruding end of the fitting 10 is a screw-threaded cap 13 which is provided with a restricted aperture 14 which, as will be seen from Figure 3, is offset from the aperture 12.

In operation, by turning each cap 13, a lubricant may be forced onto the face of the saw through the apertures 12 and 14. On tightening up the cap 13, the lubricant supply is cut off. Thus we have gravity feed of lubricant to each saw face, but the construction at the end of each duct permits the lubricant to be cut off as desired. Ordinarily, only one face of the saw should be oiled at a time, and the lubricant to the other face should be cut off. This is by reason of the fact that ordinarily the blade is turned sidewise, i. e., approximately parallel to the ground and the lubricant is run on the upper face.

If lubricant were permitted to run from the lowermost duct in this operation it would merely dribble on the ground.

The drawing shows that there is a lubricant 15 in the lubricant reservoir 7. To close the top of the reservoir, I have shown a removable cap 16 which has a projecting portion 17 that fits down within the lubricant reservoir 7. Attached to this projecting portion 17 is a wiping material 18, which may be cotton or other waste material, or steel wool if desired. This wiping material is attached to the projecting portion 17 of the cap 16 by some suitable means (not shown). In oiling the saw, the cap 16 can be removed and the blade wiped and the cap placed back in position to close the reservoir 7.

I have provided a tooth-setting arrangement which ordinarily lies below the lower hand guard. It comprises a flat metallic anvil 19 which is attached by some suitable means into an aperture formed in the lower hand guard 20. The member 19 has a flat surface 21, and a surface 22 set at an angle thereto. The surface 22 is better shown in Figure 2 of the drawing, and is formed by cutting away a portion of the surface 21. The lower hand guard is provided with a slotted recess 23 in which is pivoted a lever member 24 on a pivot 25. The lever member 24 is provided with a surface 26 which is adapted to engage one of the saw teeth and to press the saw tooth tightly against the surface 22. In order to hold the lever member 24 in its inoperative position, nested within the lower hand guard, I have shown the member provided with a notch 27 which engages with a spring 28 carried by the handle of the saw. This engagement of the spring 28 with the notch 27 places the lever 24 in its up position until the user grasps the hand or finger hold 29 and pulls the lever into a lowered position against the tension of the spring 28. In this position the user can exert considerable pressure on a tooth of the blade, which is then pressed between surface 22 and surface 26, as will be apparent from the dotted line position shown in Figure 1.

The upper hand guard 30 of the saw is provided with a V-shaped notch 31 which can be used to pull nails, thus giving the saw utility in this operation as well as for actually sawing. The grip 6 of the handle 1 of the saw enables the device to be held in operative position during the tooth setting operation.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A saw setter comprising a handle having a recess therein, an anvil member mounted on said handle adjacent said recess, a lever pivotally mounted at one end in said recess, said lever adapted to lie in said recess in its inoperative position, means in said recess cooperating with the unpivoted end of said lever to hold it in its inoperative position, said lever having a setting surface adjacent its pivot and extending at an angle to the length of the lever, whereby when the lever is swung about its pivot out of said recess the setting surface is brought into engagement with said anvil.

2. A saw setter comprising a handle having a recess therein, an anvil member mounted on said handle adjacent said recess, a lever pivotally mounted at one end in said recess, said lever adapted to lie in said recess in its inoperative position, a notch on the lever member at the unpivoted end, and a spring carried by the handle to engage the notch to hold the lever in inoperative position, said lever having a setting surface adjacent its pivot and extending at an angle to the length of the lever, whereby when the lever is swung about its pivot out of said recess the setting surface is brought into engagement with said anvil.

3. A saw setter comprising a handle having a recess therein, an anvil member mounted on said handle adjacent said recess, a lever pivotally mounted at one end in said recess, said lever adapted to lie in said recess in its inoperative position, a notch on the lever member at the unpivoted end, a spring carried by the handle to engage the notch to hold the lever in inoperative position, and guard means carried by the handle and extending beyond the adjacent surface of the handle to shield the lever in its inoperative position, said lever having a setting surface adjacent its pivot and extending at an angle to the length of the lever, whereby when the lever is swung about its pivot out of said recess the setting surface is brought into engagement with said anvil.

JAMES N. ALEXANDER.